United States Patent

[11] 3,572,775

| [72] | Inventors | John C. Bloom<br>Inglewood;<br>Frank J. Hanback, Palos Verdes; Masashi Hayase, Fountain Valley; Norman F. Robinson, Manhattan Beach; Wayne S. Wheelock, Long Beach, Calif. |
|---|---|---|
| [21] | Appl. No. | 805,594 |
| [22] | Filed | Mar. 10, 1969 |
| [45] | Patented | Mar. 30, 1971 |
| [73] | Assignee | McDonnell Douglas Corporation |

[54] BRAZED FITTINGS
2 Claims, 14 Drawing Figs.

[52] U.S. Cl. ..................................................... 285/287,
285/334.4, 285/386
[51] Int. Cl. ..................................................... F16l 13/08
[50] Field of Search.......................................... 285/286,
287, 334.4, 354, 386, 382.7, 343, 110, 93

[56] References Cited
UNITED STATES PATENTS

| 1,901,820 | 3/1933 | Parker............................ | 285/287X |
| 2,781,785 | 2/1957 | Davies............................ | 285/287 |
| 3,069,187 | 12/1962 | Collins et al. .................. | 285/110 |
| 3,264,012 | 8/1966 | Giovanzzi et al. ............. | 285/334.4X |
| 3,285,627 | 11/1966 | Kozulla et al. ................. | 285/334.4X |

FOREIGN PATENTS

| 1,488,719 | 6/1967 | France ......................... | 285/110 |

*Primary Examiner*—Dave W. Arola
*Attorneys*—Walter J. Jason, Donald L. Royer and Robert O. Richardson ABSTRACT: Metal sleeves joined to metal tubing by brazing or welding processes permit the tubing to be removably secured to fittings in piping systems. Similarly, permanent brazed connections between tubing and fittings eliminates a substantial number of potential leak points and a saving in weight is accomplished.

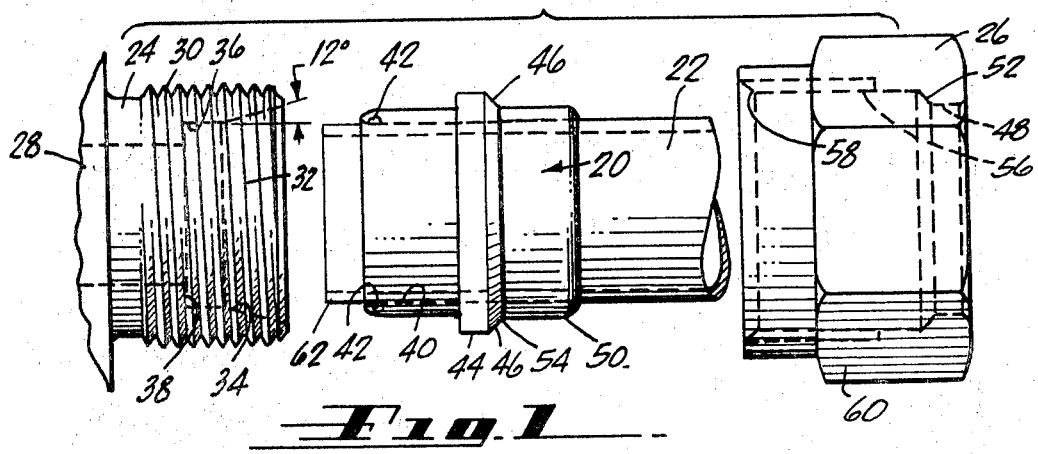
Fig. 1
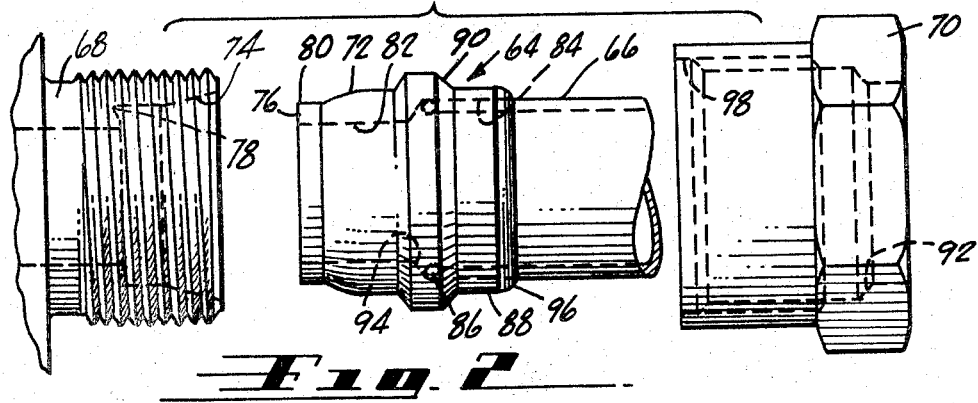
Fig. 2
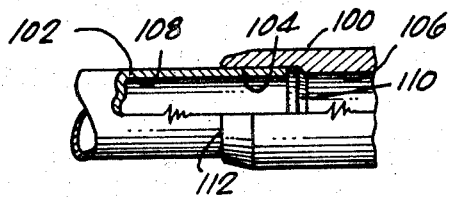 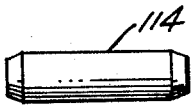 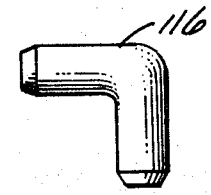
Fig. 3.  Fig. 4.  Fig. 5.
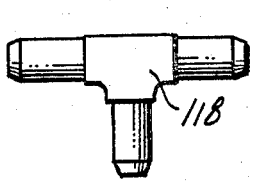 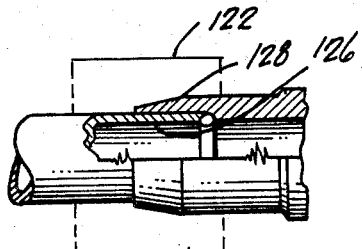 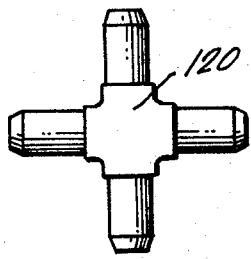
Fig. 6.  Fig. 8.  Fig. 7.
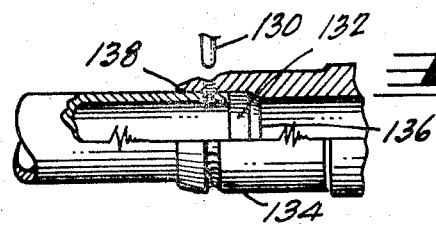
Fig. 9.
INVENTORS
JOHN C. BLOOM
FRANK J. HANBACK
MASASHI HAYASE
NORMAN F. ROBINSON
WAYNE S. WHEELOCK
BY Robert O. Richardson
ATTORNEY INVENTORS
JOHN C. BLOOM
FRANK J. HANBACK
MASASHI HAYASE
NORMAN F. ROBINSON
WAYNE S. WHEELOCK BY Robert O. Richardson
— ATTORNEY —

BRAZED FITTINGS

BACKGROUND OF THE INVENTION

Permanent brazed fittings for fluid lines are replacing separable connectors in commercial aircraft primarily because of reliability improvement of up to 500 percent. Fitting weight savings up to 40 percent may be realized through the use of permanent rather than separable connectors. Separable connectors continue to be used at points where valves, pumps and other equipment must be moved out of the airplane for replacement or maintenance. However, with pressure requirements of 3,000 p.s.i. and with a desired safety factor 4 to 1, the separable connector fittings, particularly with screw-type connections, present a leakage problem that may not be tolerated because of the potential danger, passenger inconvenience, and possible cargo spoilage that may result.

In a modern transport aircraft the use of the separable connector comprising the present invention results in the following advantages:

1. 1735 installation items and 1890 mechanical joints are eliminated, removing 5227 potential leak paths out of a possible 5782 per aircraft for an 87 percent reduction in potential leakage.
2. A reduction in weight of 394 pounds per aircraft is achieved which, at a weight reduction value of $100 per pound, represents a value of $39,400 per aircraft.

SUMMARY OF INVENTION

A sleeve is brazed over the end of a tube. A threaded nut is passed over the sleeve and is threaded onto a fitting. An external conical surface on the sleeve is engaged by the nut and as the nut is tightened onto the fitting the sleeve seats within the bore of the fitting in a fluidtight seal. The fitting is a conventional military standard part with a 12 percent tapered cone against which the outer sealing surface of the sleeve will bear. This surface has a relatively large radius of curvature which terminates in a cylindrical tip of a precisely controlled length relative to the sealing contact between the sealing surface of the sleeve and the fitting cone so that after contact of the sealing surfaces, a further insertion of the sleeve into the fitting by tightening of the nut, the tip will contact a shoulder in the end of the fitting which normally serves as a tube stop. Additional tightening of the nut produces axial loading through the tip into the fitting without significantly increasing the force on the sealing surfaces and thus damage from overtightening of the nut. There is a significant thickness of the sleeve between the outer sealing surface and the inner bore of the sleeve. This thickness is substantially that of the thickness of the wall of the tube plus the thickness of the wall of a prior art sleeve. This sleeve thickness resists the radial force due to forcing the sleeve into the cone of the fitting. Also the cylindrical tip adjacent the sealing surface reinforces it.

BRIEF DESCRIPTION OF THE DRAWINGS

FIG. 1 is an exploded pictorial representation of a prior art separable connector fitting;

FIG. 2 is an exploded pictorial view of a present detachable tube end connection;

FIG. 3 is a view partially in section showing a brazed cavity detail;

FIGS. 4, 5, 6 and 7 are views showing sample configurations which utilize such cavity detail;

FIGS. 8, 9, 10 and 11 illustrate four types or methods of joining sleeve cavities to piping.

DETAILED DESCRIPTION OF ILLUSTRATIVE EMBODIMENTS

Figure 10:
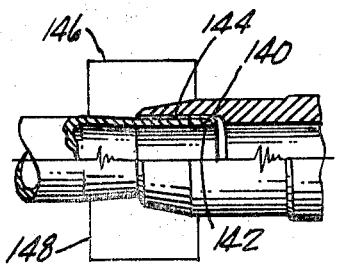

In FIG. 1 there is shown a prior art connection wherein a sleeve 20 is swaged to a tube 22 and is adapted to be inserted within the end of a fitting 24. After insertion it is retained by a threaded nut 26. Fitting 24 typically may be set forth in military specification MS–33514. This fitting has an inner conducting bore 28 and an outer threaded surface 30. Communicating with the bore 28 is an enlarged opening 32, this being a tapered inner wall inclining on the order of 12°. Wall 32 terminates in an enlarged cylindrical bore 36 having a shoulder 38 in communication with bore 28.

The flareless coupling sleeve 20 may be identified as military standard MS–21922. This sleeve has a uniform bore 40 of constant diameter except for an enlarged counter bore 42 at its outer end which is swaged onto tube 22. An outer annular ring 44 has an aft tapered wall 46 tapering on the order of approximately 35°.

The flareless sleeve coupling nut 26 may be identified as military standard MS–21921. This nut has an innermost bore 48 having a diameter to receive end 50 of sleeve 20. This bore 48 flares outwardly at 52 at an angle of about 45° to engage tapered wall 46 of sleeve 20 and the enlarged bore 56 is internally threaded to mate with threads 30 of fitting 24. An outward taper 58 of approximately 45° is provided to facilitate insertion over sleeve 20. A hexagonal outer surface 60 permits tightening of the nut 26 on fitting 24 and thus seats the outer end 62 of tube 22 against the retention wall 38 of fitting 24. It should be noted that the outer wall of end 62 is larger than the inner bore 36 of fitting 24 and abuts against the taper 34. Upon tightening of the nut 26 on fitting 24, this sleeve wall 62 is caused to compress to fit within the circumference of wall 36 to thus make a fluidtight connection.

Reference is now made to FIG. 2 wherein there is shown a new and improved sleeve 64 to be joined to metal tubing 66 by brazing or welding processes to permit the tube to be secured to a fitting 68 in a piping system. The sleeve 64 is designed to mate with the end of a fitting such as set forth in military standard MS–33514 in a manner to be interchangeable with the prior art sleeve 20 in FIG. 1 without modification of the fitting 68. The sleeve and tube assembly is secured within the fitting 68 by a nut 70 which is similar in construction to that described by military standard MS–21921, except for minor modifications as required for use with sleeve 64. The sealing surface 72 of sleeve 64 has a relatively large radius of curvature such that although a theoretical line contact exists between the sleeve and the 12 percent tapered cone 74 of fitting end 68, there is no significant indentation of the cone when the nut 70 is firmly tightened. A cylindrical tip 76 is of a precisely controlled length relative to the sealing contact between the sealing surface 72 and the cone 74 so that after contact of the sealing surfaces, a further insertion of the sleeve 64 into the fitting 68 by tightening of the nut 70, the tip 76 will contact shoulder 78 which serves as a tube stop in the end of fitting 68. Additional tightening of the nut 70 will produce axial loading through the tip 76 into the fitting without significantly increasing the force on the sealing surfaces 72 and 74 and thus prevent damage from overtightening of the nut 70. A radius 80 on the tip 76 of sleeve 64 prevents scratching the sealing surface of the cone 74 of the fitting 68 during assembly. There is a significant thickness of the sleeve 64 between the sealing surface 72 and the inner bore 82, which is substantially the thickness of the wall of tube 22 and the wall of sleeve 20. This sleeve thickness resists the radial force due to forcing the sleeve 64 into the cone 74 of the fitting 68 and thus any tendency to collapse is minimized. Furthermore, with a tip 76 adjacent to it the sealing surface 72 is reinforced.

The diameter of the sleeve socket 84 is such to provide a sufficiently close fitting with the tubing 66 that capillary force will draw molten brazing filler metal through the abutting surfaces. Socket 84 has a sufficient length to accommodate a preplaced ring 86 of brazing alloy and to provide an adequate overlap area between the sleeve 64 and tube 66 for a joint which is sufficiently strong for the service intended. At the same time, the joint is short enough that the entire capillary area will be filled by this ring 86 when melted and a visible fillet of braze alloy will form at the end of the sleeve for visual inspection. The thickness of the sleeve tail 88 is such to carry all tension and vibration loads transferred into the sleeve 64 by the tube 66. The conical surface 90 of the sleeve 64, which mates with conical surface 92 of the nut 70, has a sufficient cross-sectional area to resist the load due to the tightening of the nut 70 without sustaining damage. When the sleeve 64 is installed in the fitting 68 and the nut 70 tightened, the sleeve is held firmly at the sealing contact between 72 and 74 and a conical surface 90 provides a couple to resist vibration of the tubing. The shoulder 94 between bore 82 and the inner surface 84 of tail 88 positions the preplaced brazing alloy ring 86 such that when tube 66 is inserted into the sleeve 64 and contacts the ring 86 there is an overlap distance of the tube 66 of sufficient length that the stress concentration at the juncture of the sleeve tail 88 and cone 90 is not increased by coinciding with the end of tube 66. Although end 96 of tail 88 is shown curved in FIG. 2, it may be tapered on sizes large enough to justify it in order to reduce the stress concentration due to the abrupt change in cross section of the finished sleeve tube assembly at the sleeve end. In order that bends in the tubes 66 may be made as close to the fitting 68 as possible, the sleeve 64 is kept to a minimum overall length.

It should be noted that in a comparison of nut 70 in FIG. 2 with nut 26 in FIG. 1, the width of the hexagonal head used for tightening has been reduced to save weight. Also, there is shown an underbore 98 which permits positioning of the nut 70 over the sleeve 64 and seating on fitting 64 before engagement of the threads between the nut and fitting.

Significant differences between the fitting in FIG. 2 and that shown by the prior art in FIG. 1 are as follows:
1. There is a thicker wall at the sealing point to resist deformation due to overtightening of the tube nuts;
2. An extended tip bottoms in the tube stop shoulder in the mating part, fitting end, after a predetermined travel, to take excess tightening loads;
3. A radius on the tip prevents damage to the sealing of a mating fitting;
4. The simple cavity arrangement is adaptable to different methods of welding in addition to brazing and adhesive or bond joining;
5. A thicker tail area withstands the tensile and vibration forces possible with a higher strength brazed joint;
6. The shoulder for tube-nut engagement is designed for adequate bearing area to withstand overtorque of nut.

A comparison has been made between the fitting in FIG. 1 in which the nut 26 is made of low carbon cadmium plated steel and the fittings in FIG. 2 in which the nut 70 is of lightweight titanium. Because of brazing techniques in the latter case, as a replacement of the threaded fitting system in the former, only 673 fittings of this type was required on a particular aircraft as compared to a total of 1496 of the former fittings. This resulted in a reduction of weight from 123 pounds to a total of only 19 pounds. Other fittings to be described hereinafter also result in greater reliability and reduction in weight.

In present day and future aircraft, high pressure piping systems require a large number of piping innerconnections which become more reliable and leak resistant when they are of a permanent nature which, of course, calls for brazing whenever possible or the use of some other permanent connection. While the specific sleeve configuration described with reference to FIG. 2 has been found superior to prior art sleeves in detachable fittings where connections are made to equipment which must be removed from time to time and therefore calls for a removable fitting, it has been found that the permanent fitting such as shown in FIG. 3 will provide increased reliability and reduction in weight. The connection between fittings and tubing should be of a permanent nature whenever possible. One such connection is shown in FIG. 3 wherein fitting 100 is permanently brazed to tube 102, the end of which protrudes into the enlarged bore 104 of the fitting. This bore connects with bore 106 in the fitting, which is of the same size as the inner surface 108 of tube 102, by a conical surface 110 against which a ring of brazing alloy has been inserted. Upon brazing, the alloy passes between the wall surfaces of the tube and fitting and is exposed at the end 112 of the fitting for visual inspection. This is best accomplished when a diameter clearance of 0.006 max and .001 min is present. Such a connection is quite feasible in connecting tubing to a run line union 114 in FIG. 4, an elbow 116 in FIG. 5, and intersection tee 118 in FIG. 6, or the four-way connection 120 in FIG. 7.

In one installation where 176 run unions such as union 114 in FIG. 4 are used, there has been a weight reduction from 15.2 pounds to 2.3 pounds as compared with a conventional run union coupling. The use of the elbow 116 in FIG. 5 in a 10 elbow installation accounts for a drop in weight of from 1.9 pounds to 1.3 pounds whereas in a 66 joint installation of the tee 118 in FIG. 6 there is a reduction in weight from 14.9 pounds to 7.8 pounds and the four point fitting 120 in FIG. 7 would achieve a similar weight reduction.

Figure 11:
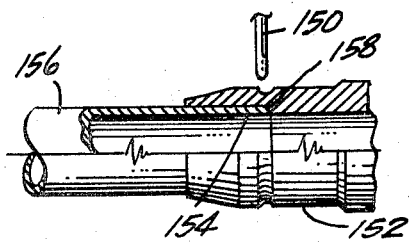

In addition to the brazing techniques as set forth in copending U.S. Pat. application Ser. No. 655,500 having a common assignee, there are at least four additional methods of making a permanent connection. In FIG. 8 there is exemplified a split die swaging technique wherein the split dies 122,124 exert pressure between end of tube 126 and fitting 128 to provide a fluidtight seal there between. FIG. 9 illustrates a lap weld technique wherein electrode 130 travels around the innerconnection between tube end 132 and fitting 134 but at a point substantially midway between end 136 of the tube and end 138 of the fitting 134. In FIG. 10 a pressed fit gasket 140 is positioned between the end 142 of the tube and end 144 of the fitting. Split dies 146 and 148 then exert a seal press fit and a shim braze or adhesive bond may be optional. In FIG. 11 the electrode 150 passes around fitting 152 at the juncture of abutment of the end 154 of tube 156 with the tapered wall 158 in the fitting. This technique is known as "butt welding."

Figure 12:
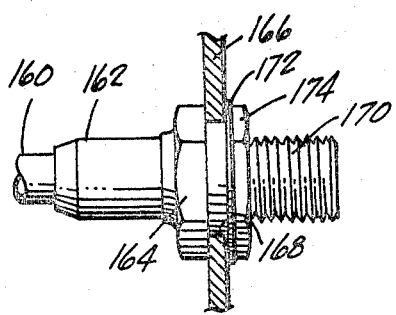
FIGS. 12, 13 and 14 show three types of bulkhead fittings.
Figure 13:
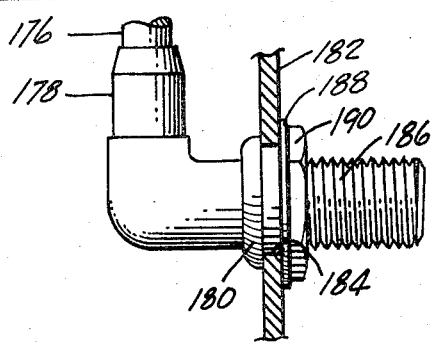
Figure 14:
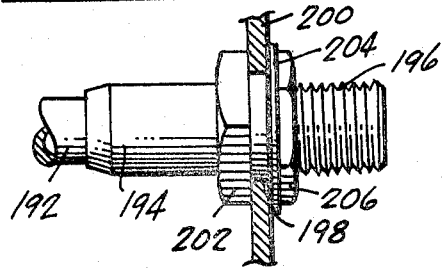

Another source of saving of weight with an increase in reliability is in the bulkhead fittings shown in FIGS. 12, 13 and 14. Bulkhead fittings are required to facilitate assembly and removal of major components in service. 50 percent of the connections and thus potential leak paths may be eliminated by brazing one side of the bulkhead fitting to the permanent pipe assembly. In FIG. 12 there is shown a tubing 160 terminating in fitting 162 to which it has been permanently brazed. This fitting 162 has an enlarged hexagonal outer surface 164 forming a collar which abuts bulkhead 166 to which it is to be fastened. Extending through aperture 168 in the bulkhead is a threaded end extension 170 of the fitting 162. A suitable washer 172 and nut 174 engages the threaded extension and holds the fitting against the bulkhead. The elbow fitting in FIG. 13 similarly has a tube 176 permanently brazed to fitting 178 having an enlarged outer shoulder 180 adapted to fit against bulkhead 182 having an aperture 184 therein to receive the threaded extension 186 of the fitting. Washer 188 and nut 190 complete the assembly. Shoulder 180 is not adapted to receive a torquing wrench since in this case a wrench may be applied to the stem of the fitting which is at right angles to the axes of the threaded nut 190. The bulkhead fitting in FIG. 14 is similar to that of FIG. 12 wherein a tube 192 is brazed with fitting 194 which has a threaded end 196 extending through an aperture 198 in bulkhead 200. In this case, however, a hexagonal headed bolt 202 is first threaded over end 196 to serve as support on one side of the bulkhead and a suitable washer 204 and nut 206 positions the fitting from the other side of the bulkhead.

We claim:
1. In combination a removable brazed fitting comprising a fitting, sleeve, tube and nut:
   said fitting having external threads to receive said nut, said fitting having a fluid passage bore with a conical opening with an abutting shoulder therebetween;
   said sleeve having a first bore of the size of said fluid passage bore, a larger bore terminating in a sleeve shoulder communicating with said first bore, a brazing material securing said tube to said sleeve, and said end of said tube abutting said sleeve shoulder;

said sleeve having a cylindrical tip end portion adapted to abut said fitting abutting shoulder and an arcuate outer surface adapted to abut said fitting conical opening in fluid-tight fluidtight relationship;

said sleeve having a circumferential ring on its outer surface having a conical shoulder thereon;

said nut having a bore of sufficient size to permit passage of said nut along said tube and a larger bore for permitting partial passage of said nut over said sleeve circumferential ring, both said bores terminating in a conical shoulder within said nut, said nut conical shoulder abutting said sleeve conical shoulder to exert sealing pressure on said fitting by said sleeve; and said cylindrical tip end portion being of a predetermined length relative to the sealing contact between said arcuate outer surface and said fitting conical opening whereby further insertion of said sleeve into said fitting by tightening of said nut will produce axial loading through said tip into said fitting without significantly increasing the force on said sealing surfaces and damage from overtightening of said nut.

2. In combination with a fitting, tube and nut, a sleeve having a bore the size of the fluid passage in said fitting and a counterbore the size of the tube end to be received therein:

said sleeve having a circumferential outer ring against which said nut may extent pressure when said nut is tightened on said fitting;

said sleeve bore and counterbore forming a tube positioning shoulder in the plane of said sleeve circumferential outer ring;

said fitting having an abutting shoulder;

said sleeve having an end adapted to abut said shoulder;

said fitting bore having a conical surface opening;

said fitting abutting shoulder positioned axially inwardly of said conical surface opening;

said sleeve having an arcuate outer surface adapted to abut said conical surface; and said nut exerting axial loading pressure sequentially through said circumferential outer ring, through said sleeve end and through said fitting shoulder without significantly increasing the force on the contacting surface between said arcuate outer surface and said conical surface and damage thereto from overtightening of said nut.

UNITED STATES PATENT OFFICE
CERTIFICATE OF CORRECTION

Patent No. 3,572,775          Dated March 30, 1971

Inventor(s) John C. Bloom et al.

It is certified that error appears in the above-identified patent and that said Letters Patent are hereby corrected as shown below:

On the cover sheet, and on the 2 sheets of drawing, "Frank J. Hanback", each occurrence, should read -- Francis J. Hanback --.

Signed and sealed this 22nd day of February 1972.

(SEAL)
Attest:

EDWARD M. FLETCHER, JR.　　　　　　　ROBERT GOTTSCHALK
Attesting Officer　　　　　　　　　　Commissioner of Patents